(12) United States Patent
Cooper

(10) Patent No.: US 7,611,267 B2
(45) Date of Patent: Nov. 3, 2009

(54) WHEEL ILLUMINATION DEVICE

(76) Inventor: William G. Cooper, 105 Haslip St., P.O. Box 37, Saltillo, TN (US) 38370

( * ) Notice: Subject to any disclaimer, the term of this patent is extended or adjusted under 35 U.S.C. 154(b) by 0 days.

(21) Appl. No.: 10/987,558

(22) Filed: Nov. 12, 2004

(65) Prior Publication Data

US 2005/0099820 A1    May 12, 2005

Related U.S. Application Data

(60) Provisional application No. 60/519,227, filed on Nov. 12, 2003.

(51) Int. Cl.
*B60Q 1/00* (2006.01)
*B60Q 1/26* (2006.01)

(52) U.S. Cl. .................... 362/500; 362/192; 362/545; 362/549; 310/73

(58) Field of Classification Search ................. 362/192, 362/193, 500, 545, 464, 473, 549, 276, 802; 310/73; 301/5.1, 101, 108, 109
See application file for complete search history.

(56) References Cited

U.S. PATENT DOCUMENTS

| | | | | |
|---|---|---|---|---|
| 3,340,389 A * | 9/1967 | Senseman | ............. | 362/500 |
| 4,539,497 A * | 9/1985 | Boyer | ............. | 310/75 R |
| 4,562,516 A * | 12/1985 | Chastain | ............. | 362/500 |
| 4,725,928 A * | 2/1988 | Strepek | ............. | 362/485 |
| 4,782,431 A * | 11/1988 | Park | ............. | 362/161 |
| 5,530,630 A * | 6/1996 | Williams, Jr. | ............. | 362/500 |
| 5,800,035 A * | 9/1998 | Aichele | ............. | 362/511 |
| 6,030,106 A * | 2/2000 | Johnson | ............. | 362/500 |
| 6,220,733 B1 * | 4/2001 | Gordon | ............. | 362/500 |
| 6,382,820 B1 * | 5/2002 | Chung | ............. | 362/500 |
| 6,612,726 B1 * | 9/2003 | Gloodt et al. | ............. | 362/500 |
| 6,789,928 B2 * | 9/2004 | Khan | ............. | 362/500 |

* cited by examiner

*Primary Examiner*—Jacob Y Choi
(74) *Attorney, Agent, or Firm*—Beem Patent Law Firm

(57) ABSTRACT

A system for illuminating a motor vehicle wheel assembly of a motor vehicle is provided, the system including a mount configured to be fixed to the wheel assembly, a plurality of lights fixed to the mount, a control circuit coupled to the plurality of lights to regulate a flow of electricity to the plurality of lights; and a power source coupled to the control circuit to provide said control circuit with electrical power for the lights, wherein the power source includes an electrical energy generating element as well as an electrical energy storing element.

43 Claims, 11 Drawing Sheets

WHEEL ILLUMINATION DEVICE

RELATED APPLICATIONS

This application claims priority from U.S. provisional patent application No. 60/519,227, which was invented by the same inventor, was filed on Nov. 12, 2003, and was entitled "Wheel Illumination Device".

FIELD OF THE INVENTION

The invention relates generally to motor vehicle accessories. More particularly, it relates to lights and sound systems for motor vehicles. Even more particularly, it relates to systems for lighting motor vehicle wheels.

BACKGROUND OF THE INVENTION

Lighting systems for automobiles have been known ever since automobiles were first invented. The first lighting systems consisted of kerosene lamps with clear or colored lenses mounted at various places on the body of the automobile to provide notice to others that the automobile was approaching, and to illuminate the automobile's surroundings. A major drawback to this system was the need to continuously recharge the lamps by filling them with oil, and trim the wicks. Further, the lamps put out a limited amount of light. Even further, unless adjusted carefully, they sooted up their reflectors.

Later, gas lighting systems were provided including lamps with integral to settling gas generators often called "carbide lamps". Carbide lamps provide an intense light that is particularly suited for illuminating the road around the automobile. While it solved the problem of wick replacement, light intensity, and wick trimming, it still required each lamp to be separately filled and cleaned regularly.

As the systems further developed, centralized gas systems were devised in which a large central gas generator provided gas to several lamps disposed about the periphery of the vehicle. This problem reduce the need for maintaining each one of several different lamps, replacing it with a single, central problem of filling, emptying, and cleaning the central gas generator. Carbide gas generators produce a noxious mix of corrosive chemicals and sludge that cannot be disposed of easily By the 1910's, battery-powered electrical lighting systems have been developed to replace the centralized gas arrangements. In these battery-powered systems, a battery disposed in the central location provided electrical energy to several lights mounted on the body of the vehicle. Wires extending from the battery were coupled to light bulbs that, in turn, illuminated the road in the surroundings of the vehicle. This solved the problem of periodic lamp cleaning, but replaced it with the problems of battery charging and battery maintenance. The batteries needed to be periodically charged. To do this, they must be either removed from the vehicle and taken to a charging station or the charging equipment must be brought to the battery in the vehicle. Either way, the lights require regular, even daily, adjustments and maintenance.

Not long after this, generators were provided on automobiles to charge the batteries used for lighting. These generators operated whenever the vehicles were running, charging the batteries to maintain a supply of electricity. This battery/generator arrangement is the most common form of present-day automotive lighting. Light elements, which include incandescent light bulbs as well as LEDs, are fixed to the body of the vehicle at various locations. Wires are coupled to these lighting elements to provide them with power. The power is provided by an alternator driven by the engine, which in turn is coupled to a battery. The battery acts as a reservoir of the electrical energy when the engine is stopped.

In addition to the centralized vehicle lighting systems, certain peripheral systems have been devised to provide extra lighting. For example, the automotive aftermarket product industry offers portable lights that plug into cigarette lighter outlets (more recently called "power outlets" since cigarettes have fallen on disfavor). These aftermarket lights can be fixed to a stalk supported by the outlet, or they can be disposed at the end of a flexible power cord that is plugged into the outlet. With these arrangements, the operator supports the light with his hand at the end of the power cord, which permits him to manipulate it and will, either inside or outside the operator's compartment.

Lights have been fixed to the interior of automobiles to light up upon the occurrence of various events, such as the unlocking of an automobile by remote control or other manipulation of remote control buttons, the opening of the door, or the opening of the trunk (boot) or hood (bonnet). Of course, it has been common to turn automotive lights on and off with electrical switches virtually since they were first used in automobiles.

Other automotive lighting systems have been triggered by optical sensors to turn on whenever the automobile (or rather, the optical sensor) is in darkness. These sensor arrangements are used with running lights (taillights and headlights) to ensure that the operator never drives the vehicle in the dark. Running lights serve two purposes: to illuminate the road for the operator's benefit, and to indicate to drivers ahead of the lighted automobile on the road and drivers behind the lighted automobile on the road of the automobile's presence.

Novelty lighting systems are a more recent development. Novelty lighting systems can be understood generally as lighting systems intended to enhance the beauty are stylishness of the automobile, and are not intended as safety measures or basic operational features. Running lights and courtesy or interior lights are not novelty lights.

Running lights, which include taillights, headlights, turn signals, parking lights, and reverse lights, are intended to enhance the safe operation of the vehicle over the road by indicating the presence of the automobile and its intentions to other automobile operators on the road. They are not "novelty lights", although they may have novelty aspects such as special colors.

Courtesy or interior lights, which include dome lights, side lights, dashboard lights, console lights, indicator lights, map lights, and instrument lights, are not intended for operators of other vehicles, but for the operators and passengers of the vehicle itself, to permit them to enter and exit the vehicle safely, and to operate the various controls within the vehicle with ease, comfort and speed. They also are not novelty lights.

Novelty lights fall in the class of lights that are not necessary or required for safe operation of the vehicle or for the operator and passenger's ease and comfort, but for the personal satisfaction of the operator. Indeed, novelty lights, if viewable from outside the car, may be specifically banned in certain jurisdictions as interfering with vehicle running lights. Add-on or aftermarket lights may only be permissible to the extent they imitate already-permissible running lights. For example, large, high output, beamed white lights can only be used on the front of automobiles, and only if they are pointed in the same direction as the automobiles and headlights. In this sense, these aftermarket lights are not "novelty" lights, but supplements to (or replacements for) headlights.

Novelty lights are not the only customizable feature of an automobile. Wheels and wheel trim have been another area of novelty customization. Automobile wheels were originally imitations of wagon wheels, having a wooden hub, with wooden spokes that extended outward to a wooden rim with metal binding. As time passed, the hub was replaced with a steel hub and the individual wooden spokes were replaced with metal spokes. By the 1920's, the entire wheel was made out of stamped or pressed metal.

Not long after this, the enthusiasm for customizing automobiles expanded to include customizing wheels. Hubcaps were devised that provided a shiny or sparkling appearance to what was otherwise plain painted metal. Hub caps originally covered just the hub of the wheel. As time passed, and wheels became solid pressed or stamped metal structures, hubcaps extended all the way across the wheel from one side of the rim to the other.

Until recently, hubcaps were fixed to the wheel itself. Either attached to the rim, or attached to the hub, they are fixed to the wheel and rotated at exactly the same speed as the wheel. These devices had no moving parts. They achieved their eye-catching effects merely by the many reflections of ambient light off their numerous faceted reflective surfaces. Recently, however, caps have been designed to sparkle even when the vehicle is stopped by mounting them on the wheel (or wheel hub) with bearings. In normal operation, as the automobile travels down the road, the hubcap is gradually accelerated to the rotational speed of the wheel. Although it is bearing mounted, and thus can spend relatively freely with respect to the wheel, the close coupling between the wheel and the hubcap causes air currents and a certain amount of mechanical drag to accelerate the hubcap. The particular advantage to this arrangement is what happens when the car is stopped. When the operator breaks the vehicle, the wheels slow down. The hubcaps, however, keep spinning even after the vehicle is stopped (for example at a stoplight). Only gradually do the frictional drag of the surrounding air and the slight residual drag of the bearing supporting the hubcap on the wheel cause the hubcap to slow down. During this deceleration, the hubcap (which typically has many bright reflective faceted surfaces), sparkles and appears to an outside observer viewing the automobile from the side as a multiplicity of bright twinkling lights.

This arrangement, however, is limited. First, the hubcap only sparkles and twinkles with light when it rotates. When it is stopped, it no longer attracts the eye of the observer. Second, the speed at which the light reflected from the hubcap twinkles and sparkles is uncontrolled. It is strictly a function of the speed at which the hubcap turns, which depends upon the maximum speed of the car before deceleration, the speed of deceleration, and the friction between the hubcap and the wheel. None of these can be controlled with any accuracy. Third, the hubcap only sparkles and twinkles with light when an external light source is shined upon it. Without street lights, lights from surrounding buildings, or lighted signage, the spinning hubcaps are virtually invisible.

What is needed, therefore, is an improved lighting system for automobile wheels. What is also needed is a wheel illuminating system. What is also needed is a means for lighting the wheels as they rotate. What is also needed is a means of providing the wheels with rotating lights. It is an object of this invention to provide such a system.

These and other objects of the invention will become clear upon reading the description and examining the drawings below in which like-numbered items in all the drawings and the description represent the same elements, features, devices, structures, processes, or methods in all the other drawings and description.

SUMMARY OF THE INVENTION

In accordance with a first aspect of the invention, a system for illuminating an automobile wheel assembly of an automobile is provided, the wheel assembly including a hub, a wheel, and a tire, the system including a mount configured to be fixed to the wheel assembly, a plurality of lights fixed to the mount, a control circuit coupled to the plurality of lights to regulate the flow of electricity to the plurality of lights, and a power source coupled to the control circuit to provide said control circuit with electrical power for the lights, wherein the power source includes an electrical energy generating element as well as an electrical energy storing element.

The control circuit may be a switch. The control circuit may be configured to automatically turn the plurality of lights on and off. The control circuit can be configured to store light patterns. The control circuit can be configured to change light patterns automatically. The control circuit can further comprise a remote-control receiver configured to receive remote-control signals. The control circuit can be responsive to remote-control signals indicative of a pattern of light illumination. The control circuit can be configured to change the colors of the lights. The control circuit can be configured to turn the lights on and off. The control circuit can be configured to change the rate at which the lights are turned on and off. The control circuit can be responsive to automatically turn off the lights. The control circuit can be configured to energize the lights when the wheel assembly is stationary. The control circuit can be configured to change the intensity of the plurality of lights in synchrony with an audio source. The audio source may be a sound system disposed in the automobile.

The electrical energy generating element may be a generator. The generator may have a generator rotor and a generator stator. The generator rotor may be coupled to the wheel assembly to rotate with the wheel assembly when the automobile is driven over the ground. The generator stator may remain stationary as the automobile is driven or rotate at varying rates as long as the rate of rotation is less than the rate of rotation of the generator. The generator may be coupled to the automobile wheel assembly to rotate and generate electricity when the automobile is driven. The generator may be coupled to the automobile wheel assembly to not rotate and not generate electricity when the automobile is stopped. The electrical energy generating element may include a solar panel for direct conversion of light to electrical energy.

The plurality of lights may include LEDs, incandescent lights, fluorescent lights, neon, electroluminescent panels, and ultraviolet lights. Each of the plurality of lights may have a color different from others of the plurality of lights. The lights may be mounted in light mounts, such as swivels, flexible goosenecks, tubes, or extension tubes.

The lights may be coupled to a housing and face outward. The housing may support the light mounts in which the lights are mounted. The lights may be pointed to the wheel assembly to reflect light off the wheel assembly toward an observer. The lights may be coupled to a wheel of the wheel assembly. The lights may be coupled to a hole formed in the wheel. The lights may be stuck to the wheel.

The mount may include a housing. The housing may enclose the lights. The housing may enclose the control circuit. The housing may enclose the power source. The housing may include a cap removably fixed to a cylindrical unit base or a unit base which corresponds to the configuration of the cap. The cap may be screwed to the unit base. The cap may be configured as a spinner. The spinner may have three points, or be a three-point star. The spinner may have four points or be a four-point star. The solar panel may be fixed to an outer surface of the housing.

The system for illuminating a wheel assembly may further include a remote control configured to communicate with the control circuit. The remote control may be a wireless remote control. The remote control may be configured to activate the lights. The remote control may be configured to control the lights.

The mount may include a lower section fixed to the wheel assembly to rotate with the wheel assembly; an upper section enclosing the control circuit and the power source; and a bearing disposed between the lower section and the upper section to permit relative rotation between the lower section and the upper section. The upper section may include a unit base; and a cover; wherein the unit base and the cover are coupled together to define an internal cavity configured to receive and support the control circuit and the power source. The plurality of lights may be coupled to holes formed in the unit base. The plurality of lights may be coupled to the unit base and are directed toward the wheel. The plurality of lights may be selected from the group consisting of LEDs, incandescent, electroluminescent panels, neon, fluorescent lights, and ultraviolet lights. The electrical energy generating element may include a generator, and further wherein said generator may be coupled to said lower section to be driven thereby. The generator may be coupled to and charges the electrical energy storing element.

In accordance with a second aspect of the invention, a system for illuminating an automobile wheel assembly of an automobile is provided, wherein the wheel assembly includes a wheel and a tire, the system including: a plurality of lights configured to be supported on the wheel, a control circuit configured to be supported on the wheel, wherein the circuit is coupled to the plurality of lights and regulates a flow of electricity to the plurality of lights; and a power source configured to be supported on the wheel, wherein the power source is coupled to the control circuit to provide said control circuit and said plurality of lights with electrical power.

The control circuit may include a receiver responsive to a wireless remote control. The receiver may control the operation of the plurality of lights in response to signals received from the wireless remote control. The control circuit may control the plurality of lights to emit light in a plurality of light patterns, and further wherein the control circuit is responsive to the remote control to change the light patterns. The plurality of lights may be capable of emitting light when the wheel is not rotating and when the wheel is rotating. The system may further include a mounting plate having a plurality of holes that are configured to engage lug nuts securing the wheel to the automobile, wherein the plurality of lights, control circuit, and power source are supported by the mounting plate. The system may further include an enclosure supported by the mounting plate, wherein the plurality of lights, control circuit, and power source are supported within the enclosure. The wheel assembly may further include a hubcap, and further wherein the plurality of lights, control circuit, and power source are configured to be supported by the hubcap. The system may further include a mounting plate configured to be fixed to the hubcap, wherein the plurality of lights, control circuit, and power source are configured to be supported by the mounting plate. The system may further include the wireless remote control, which is configured to communicate with the receiver to control electrical power sent to the plurality of lights. The control circuit and plurality of lights may be configured to emit at least one pattern of light, and further wherein said wireless remote control is configured to change said at least one pattern of light. The control circuit may be configured to change an intensity of the plurality of lights in response to an audio signal received by the receiver. The control circuit may be configured to change a rate at which the plurality of lights go on and off in response to signals received by the receiver.

DETAILED DESCRIPTION OF THE PREFERRED EMBODIMENTS

Figure 1:
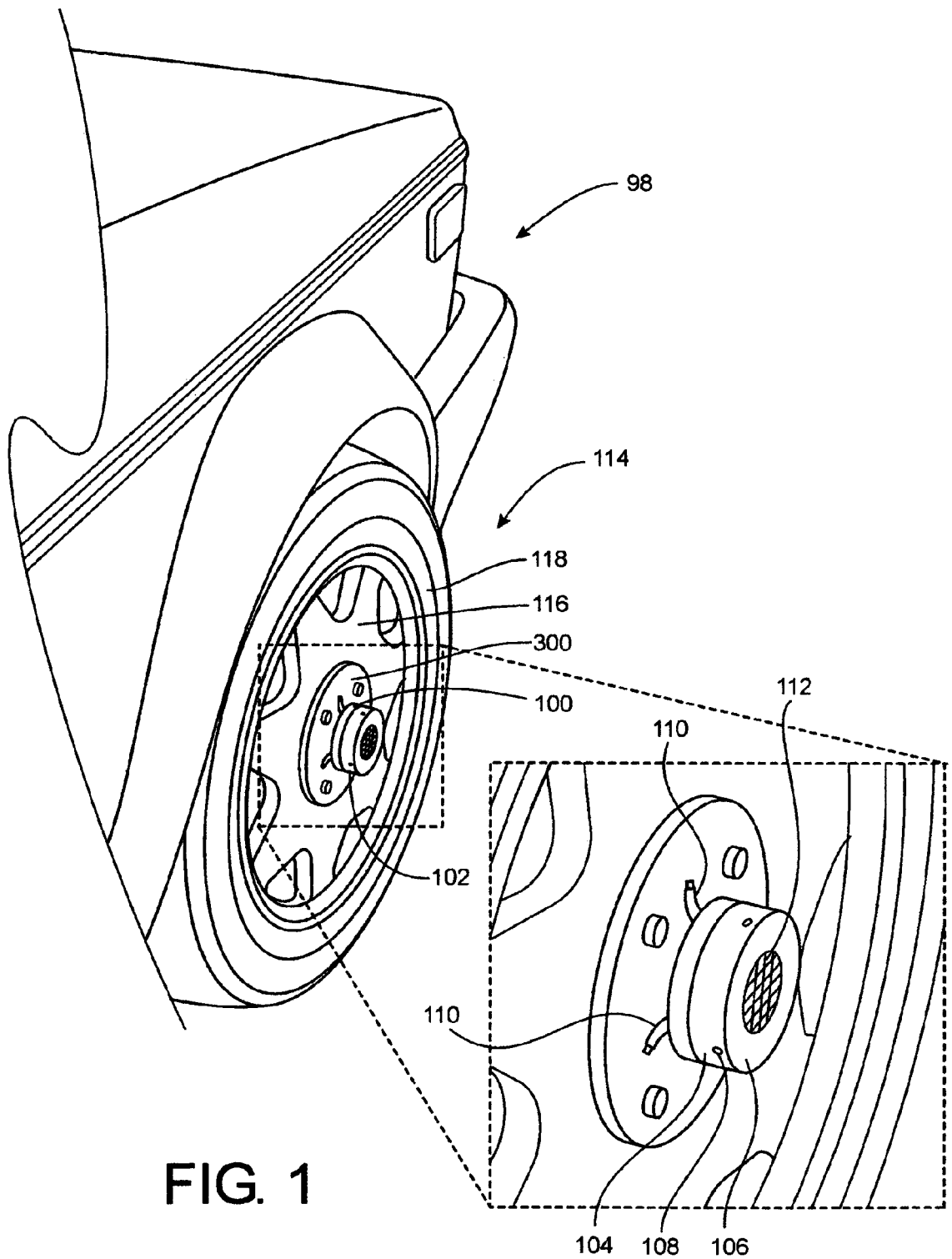
FIG. 1 is a perspective view of an automobile having a wheel assembly with a wheel illumination device in accordance with the present invention attached thereto.

FIG. 1 is a perspective view of an automobile 98 having a wheel assembly 114, the wheel assembly having a wheel illumination device 100 attached thereto. Wheel illumination device 100 includes a housing 102 further comprising a cylindrical unit base 104 that is enclosed with a cover 106. Several fasteners 108 extend through holes in cover 106 and are threadedly engaged with matching or corresponding holes (not shown) in base 104. Lights 110 extend through apertures in the back of the wheel illumination device 100, extending around the edges of the wheel illumination device where they are directed toward the wheel itself. Lights 110 are controlled by control circuitry (not shown) inside housing or enclosure 102. A solar panel 112 is fixed to cover 106 to receive solar radiation and power the lights. Other power sources, discussed below, may also be used in place off, or in addition to solar panel 112.

Housing 102 is fixed to universal mounting plate 300, which is, in turn, fixed to lug nuts on the wheel. This mounting arrangement is shown in more detail in FIG. 18.

Wheel assembly 114 includes a wheel 116 and a tire 118 mounted thereon. Wheel assembly 114 also includes a wheel hub (see e.g. the wheel of FIG. 19).

The wheel 116 of the automobile 98 is a front wheel that is steerable with respect to the rest of automobile 98. Although wheel 116 is illustrated as a front wheel, it may also be a rear wheel. Automobile 98 has a wheel illumination device 100 fixed to each of the four wheels.

Figure 17:
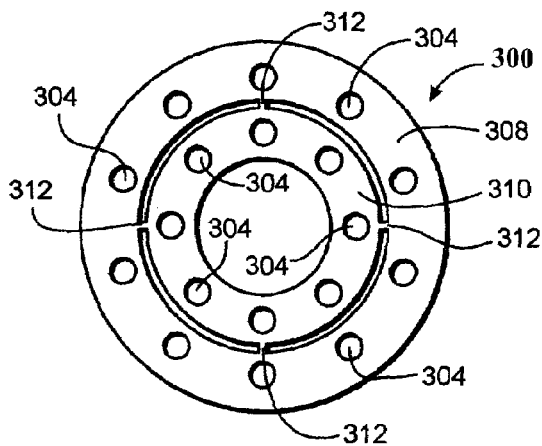
FIG. 17 is a plan view of a universal attachment plate for coupling the base of the wheel illumination device to a wheel.

In FIG. 1, the additional unused holes and slots in plate 300 have been removed for ease of illustration. It should be understood, however, that the plate 300 in FIG. 1 is the same plate 300 shown in FIGS. 17, 18, and 19.

Figure 2:
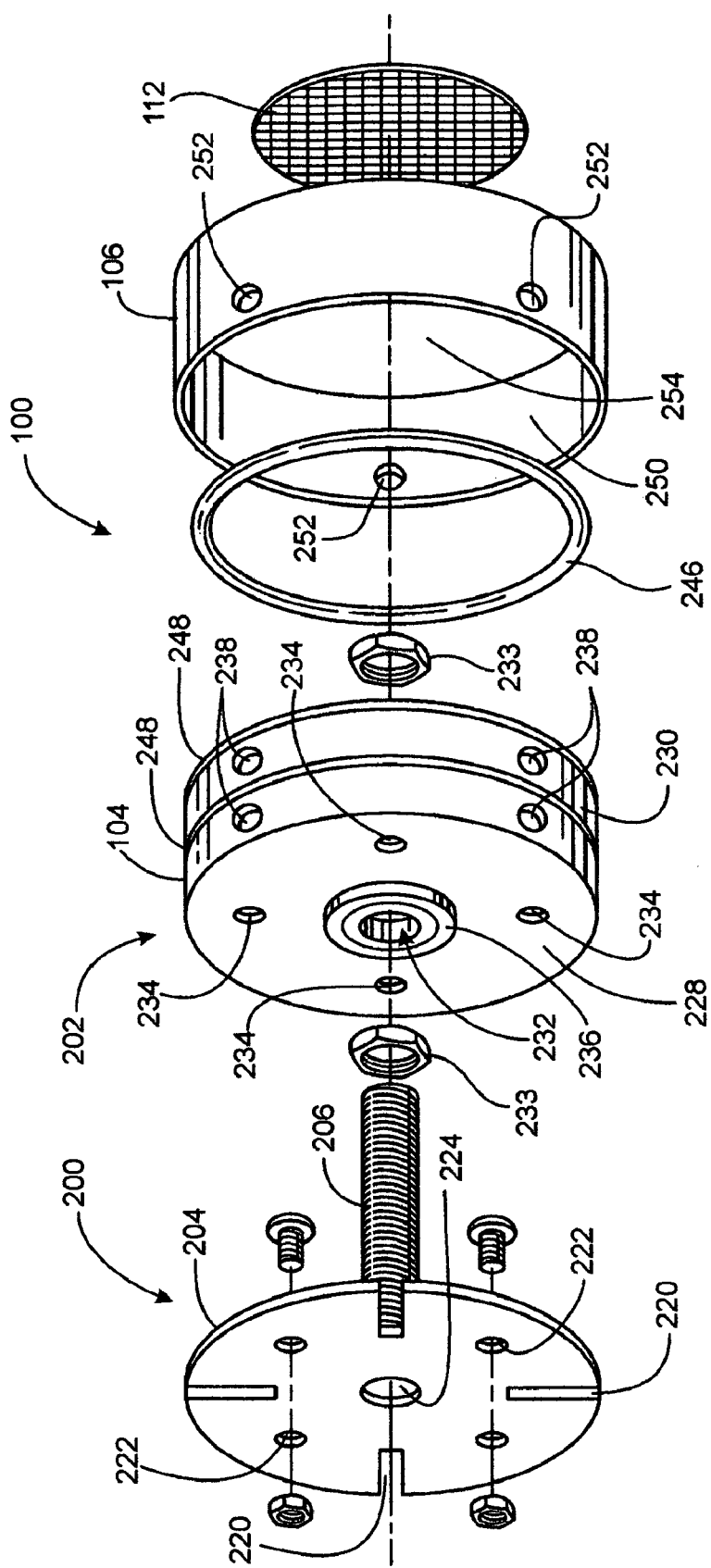
FIG. 2 is an exploded view of the wheel illumination device of FIG. 1.

FIG. 2 is an exploded view of the wheel illumination device 100 of FIG. 1 with lights 110 and fasteners 108 removed. The wheel illumination device includes a lower section 200 and an upper section 202. Lower section 200 includes a base 204 and a shaft 206. Upper section 202 comprises housing 102, which includes a unit base 104 that is enclosed by a cap or cover 106. Upper section 202 supports lights 110, and electronics box 214, and rechargeable batteries 216. A solar panel 112 is affixed to the outside of cap or cover 106.

Lower section 200 is provided to couple the remainder of the illumination device to the wheel assembly 114. It has a base 204 for attaching the illumination device 100 to the wheel assembly 114 from which shaft 206 extends.

Figure 3:
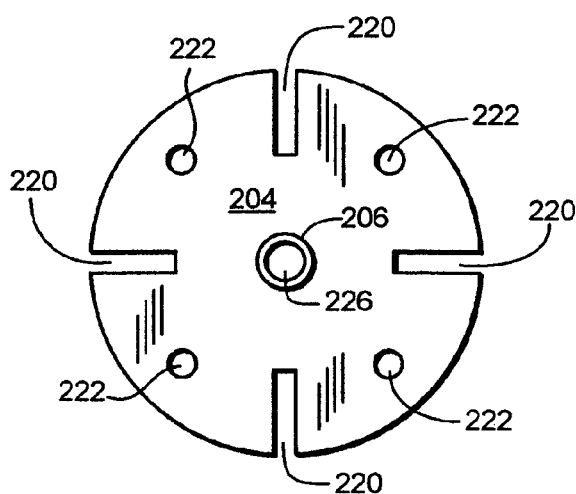
FIG. 3 is an end view of the lower section of the wheel illumination device of FIG. 2.

Referring now to FIGS. 2-3, base 204 is preferably a planar and circular disk; however, it is not limited to this configuration. It has several features that enable it to be easily coupled to the wheel assembly. These features include several narrow slots or cuts 220 that extend radially from the periphery of the base inward toward the center of the base. Several slots 220 (preferably three or four) are preferably provided in base 204. They are preferably spaced equidistantly around the periphery of the base. In addition to slots 220, base 204 has a series of holes 222, preferably three or four (as shown here), that are positioned equidistant from the periphery of base 204 and preferably in a symmetrical pattern. Base 204 also has a central hole 224 that, like slots 220 and holes 222, extends completely through the base. Base 204 is preferably made of a lightweight metal or metal alloy. It may also be formed of a polymer or plastic that may be fiber reinforced, such as by carbon fibers. Other lightweight and durable materials may also be used. Base 204 is preferably between 1½ and 5 inches across.

Shaft 206 is fixed (preferably welded or swaged) to base 204. It is coupled to and between base 204 and unit base 104 of upper section 202. Shaft 206 is hollow and cylindrical defining a central aperture 226 that extends the length of the shaft. Shaft 206 is coupled to base 204 such that a continuous passageway is formed that extends completely through central hole 224 and aperture 226 of shaft 206, extending completely through base 204 and shaft 206. Shaft 206 is preferably mounted perpendicular to base 204 and fixed to the center of base 204. It is preferably constructed of lightweight metal or metal alloy, but may also be formed of a plastic or polymer that may be reinforced, such as by carbon fiber. Other lightweight and durable materials may also be used.

Figure 18:
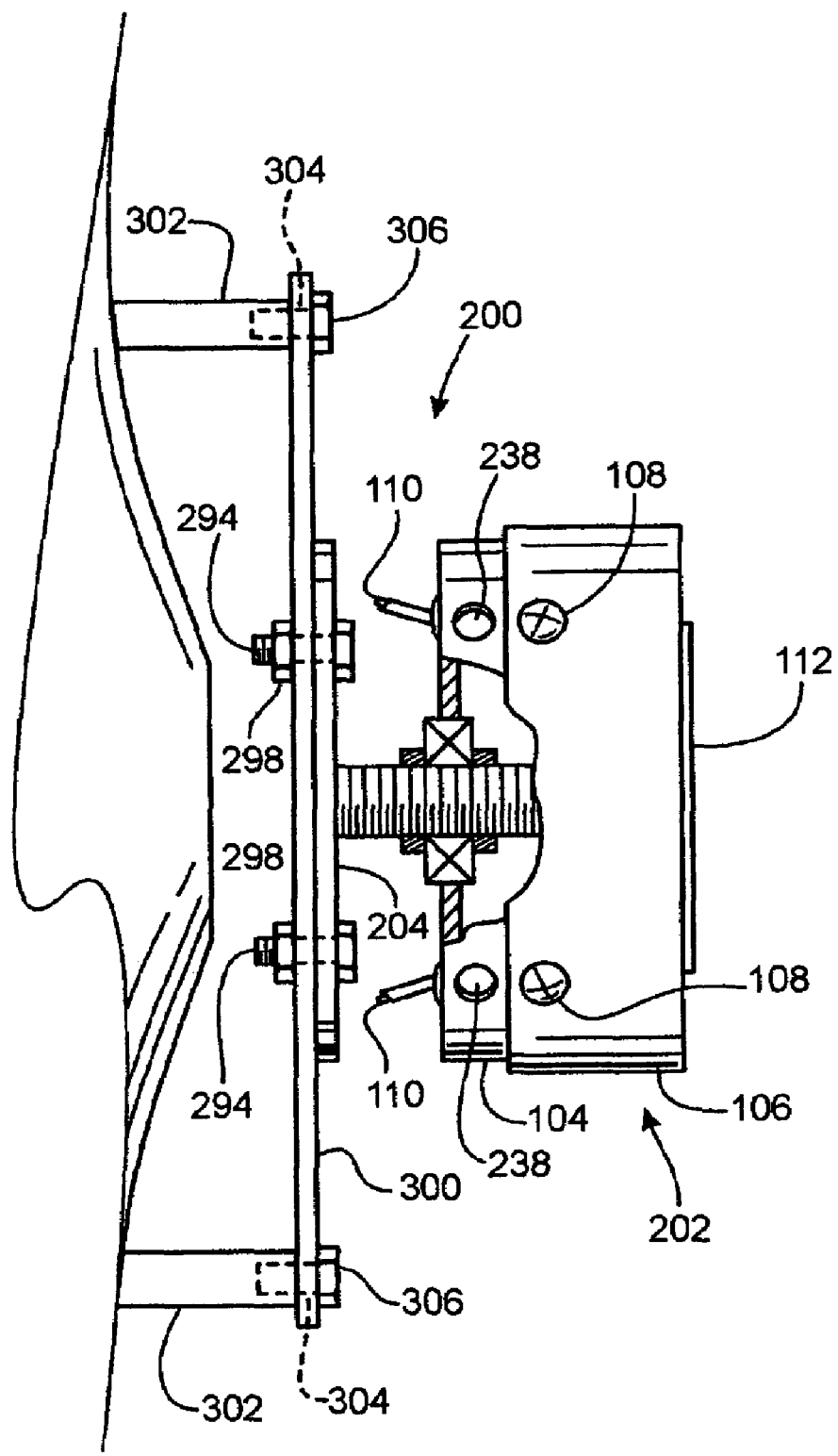
FIG. 18 is a partial cross sectional view of the wheel illumination device of the foregoing FIGURES coupled to the universal attachment plate of FIG. 17, which is in turn coupled to lug nuts of the wheel assembly.

The lower section of the power unit 200 (FIG. 2) comprises the attachment base 204 first adapting region, and a shaft 206 second adapting region. In (FIG. 16), the attachment base 204 of the lower section of the power unit (FIG. 2) is attached to any existing hub cover already on the automotive wheel (O.E.M.) or any after market hub cover designed to fit a specific automotive wheel, or a hub cap by directly bolting it using bolts 294 and nuts 298 after holes 296 have been made in the hub cover or hub cap positioned to align with the position of the holes in the attachment base 204. In FIG. 18, the attachment base 204 is centrally bolted to a universal attachment plate 300 which replaces the existing hub cover and bolts into a replacement lug nut 302 which is of the extension type (or longer than standard) and the lug nuts 302 are threaded inside its entire length.

Figure 5:
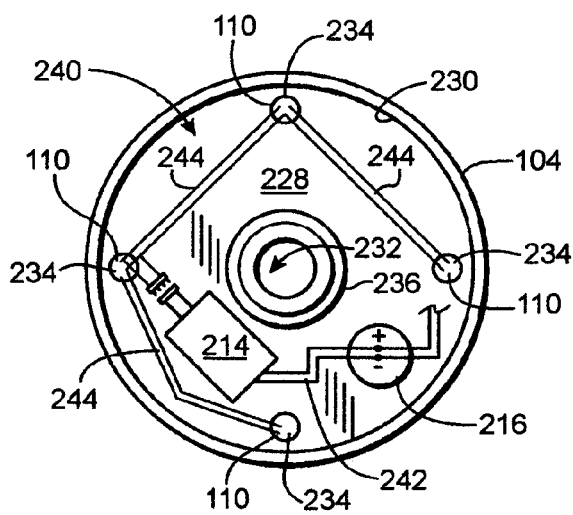
Figures 6, 7:
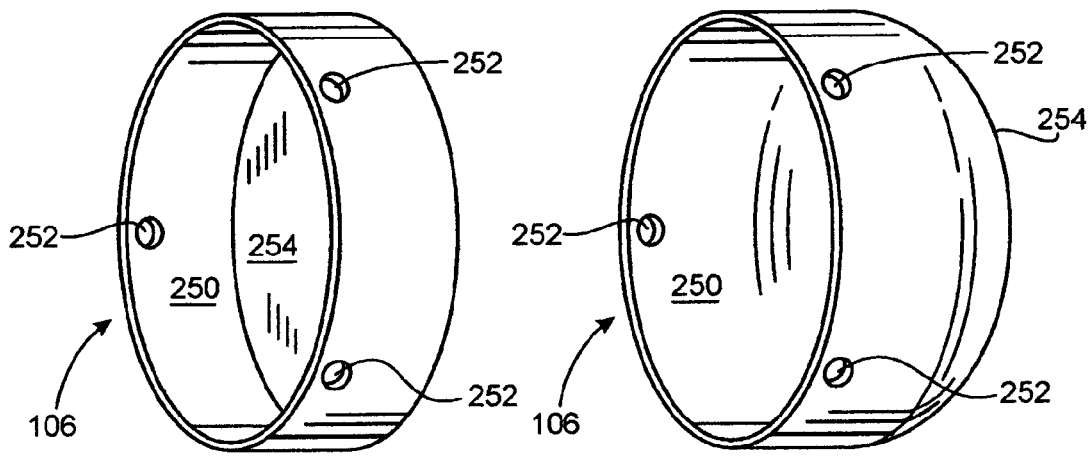
FIGS. 6-9 are perspective views of four alternative covers for the upper section of wheel illumination device of FIGS. 1-3.

Upper section 202 of wheel illumination device 100 includes a unit base 104 and a cap or cover 106 that encloses the unit base defining a hollow cavity. Upper section 202 also includes lights 110 (FIGS. 1, 16, 18-19), electronics box 214 (FIG. 5), and rechargeable batteries 216 (FIG. 5). The lights, electronics box and rechargeable batteries or disposed inside the hollow cavity formed by unit base 104 and cap or cover 106. Upper section 202 also includes solar panel 112 that is fixed to the outside of cap or cover 106.

Figure 4:
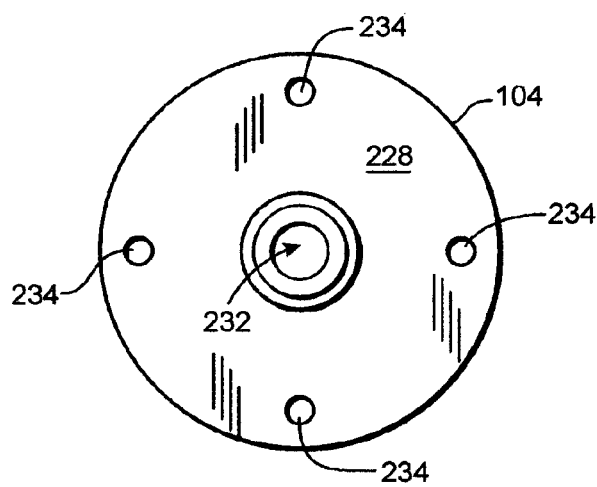
FIGS. 4-5 are opposing end views of the unit base of the upper section of the wheel illumination device of FIGS. 1-3 showing the electronics box, rechargeable batteries, and lights installed inside the unit base.

Referring to FIGS. 2, 4 and 5, unit base 104 has a planar bottom 228 coupled to a cylindrical wall 230. Bottom 228 has a central hole 232. Unit base 104 is coupled to shaft 206 by inserting a shaft 206 through central hole 232 and tightening jam nuts 233 on either side of bottom 228. When unit base 104 is fixed to shaft 206 in this manner, bottom 228 is parallel to base 104 and perpendicular to shaft 206. To assemble unit base 104 to shaft 206, the operator first places a jam nut 233 on shaft 206. The operator then inserts the free end of shaft 206 into and through central hole 232. The operator then threads a second jam nut 233 on to the free end of shaft 206, and tightens the jam nuts together.

Retaining rings are preferably used in place of jam nuts 233 if shaft 206 is not threaded. Unit base 104 can be positioned either closer to or farther from base 204 (coupled to the wheel) by adjusting the relative position of jam nuts 233. This is particularly valuable when adjusting the wheel illumination device 100 to an optimum position that will most pleasingly illuminate the wheel.

Bottom 228 has several holes 234 that extend completely through bottom 228. These holes provide electrical access to a series of illumination systems, such as lights 110. There are preferably at least four holes 234 distributed equally about the periphery of bottom 228 and adjacent an outer edge of bottom 228. Each of holes 234 supports at least one associated light 110. These lights are preferably LEDs, although other illumination sources may be used. Bottom 228 is preferably larger than the diameter of base 204.

Unit base 104 is supported on the end of shaft 206. In the preferred embodiment, it is free to rotate with respect to shaft 206, and preferably to stay stationary as the automobile 98 travels down the road and the wheel (and shaft 206 fixed to the wheel) rotates. This free rotation of unit base 104 is provided by bearing 236, which is fixed to bottom 228 and defines central hole 232. When shaft 206 is fixed to bottom 228, with jam nuts, it is fixed to bearing 236. Bearing 236, in turn, is fixed to bottom 228. Bearing 236 is preferably a sealed bearing, it may also be an oil impregnated brass fitting. By this arrangement, unit base 104 rotates with respect to shaft 206.

Cylindrical wall 230 preferably has a thickness of between 1 and 5 mm and is preferably about ½" to 2 inches in height. Wall 230 has a series of openings or holes 238. These holes are positioned generally vertically with respect to the planar surface of bottom 228. This enables various height positions.

The upper section of the power unit 202 (FIG. 2) comprises a unit top or unit cap 254 generally consisting of a portion which is cylindrical and slightly larger in diameter than the cylindrical diameter of the unit bottom 228 and the height of the cylinder wall of the unit cap 254 is generally between about one inch and about three inches but not limited to these measurements. Additionally, the bottom of the cylindrical shaped unit bottom 228 is characterized by a larger opening or hole 232 which is generally centered but not limited to the position which is generally fitted with a sealed type bearing which has a centralized opening 236 consistent with the diameter of the shaft 206 of the lower section of the power unit (FIG. 2). The opening 232 is not limited to a sealed type bearing but may include any arrangement which would allow minimally restricted rotation of the lower section of the power unit (FIG. 2) in respect to the upper section of the power unit (FIG. 2) such as an oil impregnated brass fitting.

FIG. 5 is a plan view of the open end 240 of unit base 104 with cover 106 and shaft 206 removed. Unit base 104 supports lights 110, electronics box 214, and rechargeable batteries 216. Lights 110 are electrically coupled to electronics box 214, which is electrically coupled to batteries 216, which, in turn, may be electrically coupled to generator 282 and/or solar panel 112.

Electronics box 214 is preferably secured to the inside of bottom 228 and is positioned off center. This provides room to fix jam nut 233 (FIG. 2) onto shaft 206 inside unit base 104. It also provides an off-center counterweight inside the upper section 202 that tends to keep the upper section 202 from rotating. Alternatively, electronics box 214 may be attached to the inside of cylindrical wall 230 or to the inside of cover 106 (preferably off-center).

Electronics box 214 contains a modular circuit board (with circuitry shown in FIG. 20), which controls the functions of the wheel illumination system. Box 214 receives its electrical power from wiring harness 242. Wiring harness 242 is coupled to rechargeable batteries 216. Box 214 emits an electrical charge into wiring harness 244. Wiring harness 244 is coupled to four lights 110, each light 110 being mounted in and supported by a corresponding hole 234. Lights 110 face outwards, toward the wheel.

Rechargeable batteries 216 are preferably secured to bottom 228 of base 104. Batteries 216 are positioned off center, like electronics box 214, and for the same reason. Alternatively, batteries 216 may be attached to the inside surface of cylindrical wall 230, or alternatively to the inside of cover 106 (preferably off-center). Batteries 216 may alternatively be coupled to upper section 202 in any position that allows the weight of the batteries to counterweight the upper section to control the amount of rotation as the wheel rotates and the automobile 98 travels down the road.

Referring back to FIG. 2, upper section 202 further includes a seal 246 that is generally circular and preferably made of rubber. Seal 246 is placed over the outside of cylindrical wall 230 and placed in either of two shallow grooves 248. Grooves 248 are circular and extend around the outside of cylindrical wall 230. Grooves 248 are spaced approximately a half an inch apart. Each groove 248 is parallel to bottom 228 of unit base 104. Holes 234 are formed in the cylindrical wall 230 adjacent to each of parallel grooves 248. Holes 234 are on the side of grooves 248 closer to bottom 228.

Cover 106 includes a cylindrical wall 250 that is slightly larger in diameter than cylindrical wall 230 of unit base 104. The height of wall 250 is preferably between 1 and 3 inches. Several holes 252 are formed in cylindrical wall 250 that correspond in location with holes 238 in cylindrical wall 230 or preferably equal in number to holes 238.

Holes 252 and holes 238 are disposed and can be aligned such that fasteners 108 such as bolts, screws or rivets can be inserted into holes 252 and into holes 238 to removably fix cover 106 to unit base 104. Cylindrical wall 250 is sized to cover cylindrical wall 230 and abut seal 246. Seal 246 prevents water and other contaminants from leaking into upper section 202 between unit base 104 and cover 106.

Figures 8, 9:
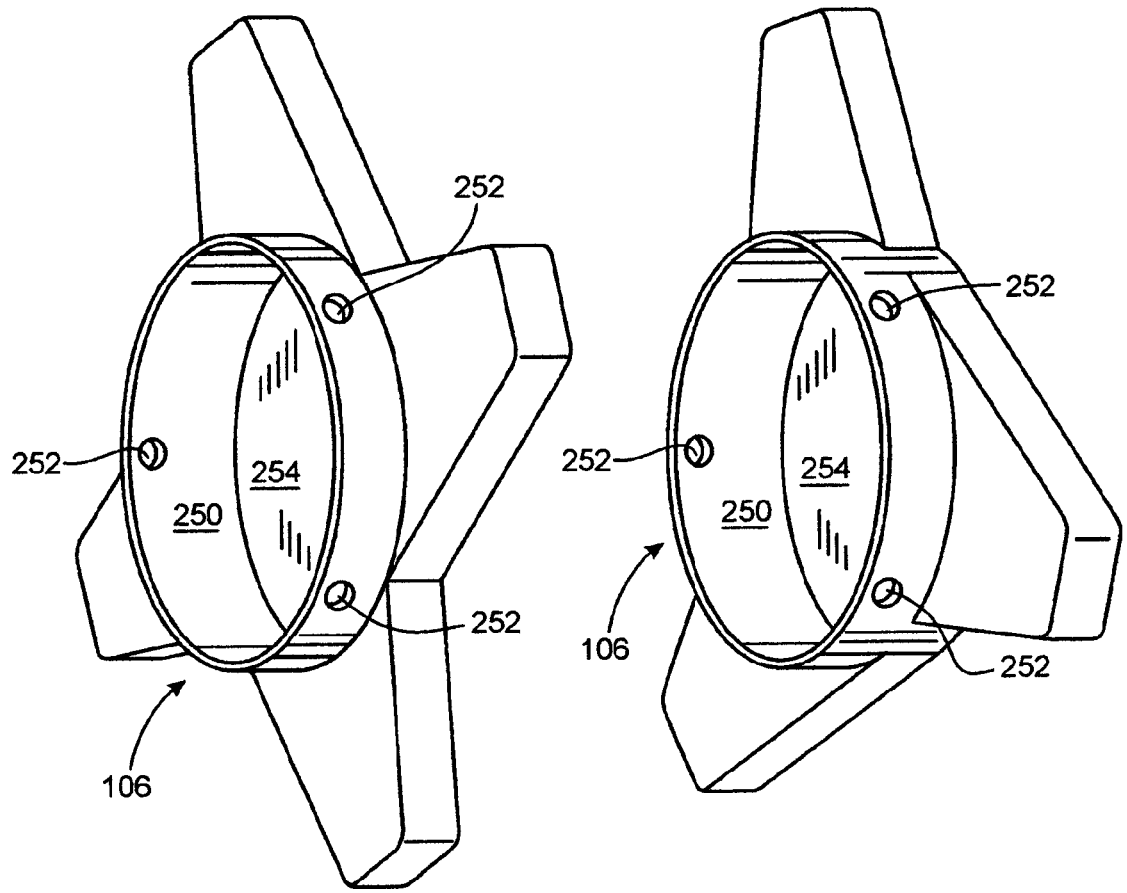

Referring now to FIGS. 6-9, alternative covers 106 include a top 254 that extends across and encloses cylindrical wall 250. Top 254 may have various shapes, such as those shown in FIGS. 6-9, including a flat top (FIG. 6), a rounded top (FIG. 7), a four-pointed spinner (FIG. 8) and a three-pointed spinner (FIG. 9).

The outside diameter of cover 106 is preferably between 3 inches and 8 inches. Cover 106 is preferably composed of a lightweight metal or metal alloy, although various types of plastics or carbon fiber reinforced plastics may be used. Cover 106 is preferably reflective, having a chrome, chrome-plated, brushed, or polished aluminum finish. In the alternative, it may also be painted with visually pleasing paints such as metallic paints and fluorescent paints. It may also have patterns or designs on its outer surface.

Illumination sources or lights 110 can be coupled directly to holes 234, or alternatively, they can be mounted to holes 234 using light mounts, such as those light mounts shown in FIGS. 10-13. Examples of these light mounts as installed can be found in FIGS. 1, 16, 18, and 19.

Figure 10:
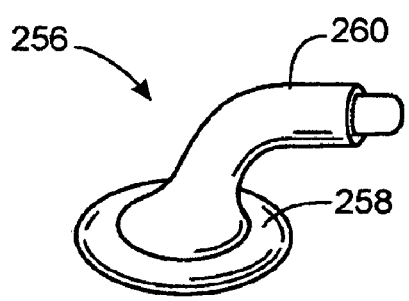
FIGS. 10-13 are perspective side views of alternative light mounts for the wheel illumination device of FIGS. 1-5.
Figure 11:
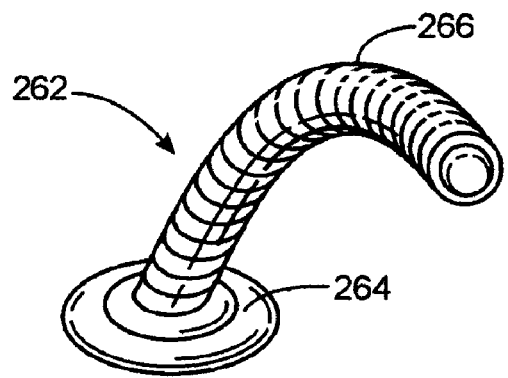
Figure 12:
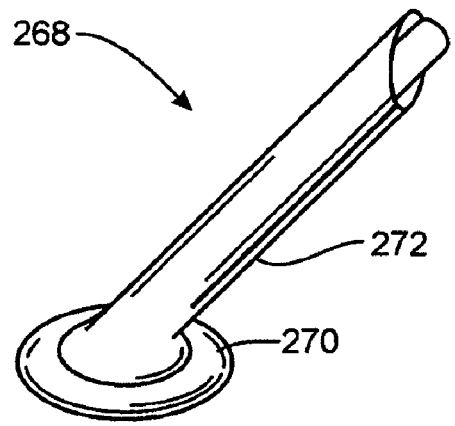
Figure 13:
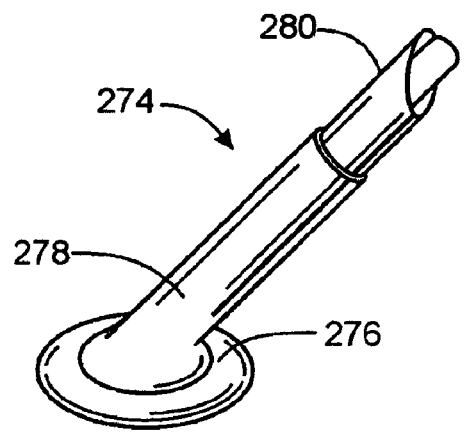

FIG. 10 shows a swiveling light mount 256 having a collar 258 that is fixed in hole 234, and a flexible shaft 260 to which light 110 is coupled. FIG. 11 shows a gooseneck light mount 262 including a collar 264 that is fixed in hole 234, and a flexible shaft 266 to which light 110 is coupled. FIG. 12 shows up a tubular light mount 268 having a collar 270 that is fixed to hole 234 and an elongated tubular shaft 272 to which light 110 is coupled. FIG. 13 shows an extension tube light mount 274 that includes a collar 276 from which two nested tubes 278, 280 extend. Tubes 278, 280 are nested, with tube 280 nested inside tube 278. Tube 280 can be extended from tube 278 by pulling gently on the end of tube 280. Light 110 is fixed to the end of tube 280 such that it can be extended and retracted whenever tube 280 is extended and retracted.

In each of the examples of FIGS. 10-13, light 110 is preferably an LED that extends outward away from its associated light mount and hole 234, directing light outward away from device 100 and toward the wheel to which device 100 is mounted. These lights provide illumination for the wheel. Electrical power is provided to each of lights 110 in FIGS. 10-13 by wires (not shown) that are coupled to lights 110, that extend through the light mounts and that pass through holes 234 in bottom 228. FIG. 5 shows how electricity is carried to each of holes 234. Each of the lights is electrically connected to the modular circuit board of electronics box 214 by wiring harness 244.

The electronics box 214 shall contain the modular board which controls the functions of the illumination system and wherein the electronic box 214 receives electrical charge and same the electronics box 214 emits electrical charge into a wiring harness 244 (FIG. 5). Additionally the upper section of the power unit 202 (FIG. 2) is comprised of rechargeable batteries 216 (FIG. 5), fifth adapting region, providing electrical charge to the electronics box 214. The illumination sources or lights can be mounted by various means to the unit bottom 228 generally using light mounts (FIGS. 10-13) such as swivels 256, flexible goosenecks 260, tubes 268, or extension type tubes 274, but not limited to the mentioned light mounts which receive electrical supply through the wiring harness 244 which passes through the holes 234 (FIG. 2) in the unit bottom 228. The power unit (FIG. 1) is designed to allow for an optional, auxiliary power supply in addition to the primary power supply of the solar cell 112 if the environment exists which requires more electrical charge than the solar cell 112 or cells can supply for the existing demand generally comprised of a generator 282 (FIG. 15) mounted inside the unit bottom 228 by using adjustable mounting brackets 284 which allows for varying sizes of gears; the shaft gear 290 (FIG. 15) on the portion of the shaft 206 (FIG. 15) which passes through the sealed bearing 236 into the interior space of the unit bottom 228 positioned to generally align with the generator gear 288 (FIG. 15) which is attached to the generator shaft 286 and the electrical charge generated as the shaft 206 (FIG. 15) turns when attached to a rotating wheel but the upper section of the power unit 202 (FIG. 2) does not rotate due to the counter weight of the electronics box 214 (FIG. 5) and rechargeable batteries 216 (FIG. 5) is wired into the rechargeable batteries 216.

In an alternative embodiment, lights 110, and light mounts 256, 262, 268, 274 may be disposed in a similar matter on any or all of cover 106, wall 230, and wall 250 as they are on bottom 228. In another alternative arrangement, lights 110 need not be fixed to the outside of upper section 202, but may be mounted inside upper section 202 as well. In this configuration, holes may be provided in the walls of upper section 202, such as holes 234 in bottom 228 or other holes formed in unit base 104 or cover 106, through which light from lights 1110 located inside upper section 202 radiate.

Referring back to FIG. 2, solar panel 112 is preferably fixed to the outer surface of top 254 of cover 106, with electrical wires from solar panel 112 passing through an opening (not shown) in cover 106. These wires are also coupled to rechargeable batteries 216 (see FIG. 5). Solar panel 112 is preferably circular, as shown in FIG. 2, although it may be square or have an irregular shaped boundary. While a single solar panel is preferred, one or more solar panel 112 may be employed.

The generator 282 is the power source of the device. The power supply is from the generator 282 with the solar panel 112 as the alternative, or can be used in addition to the generator 282.

Figure 14:
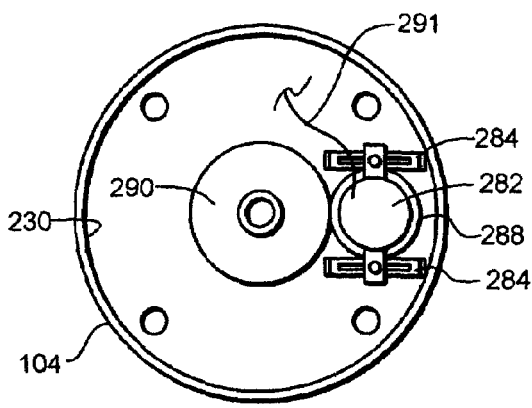
FIGS. 14-15 are cross-sectional side and end views of the unit base of the wheel illumination system with the electronics box, rechargeable batteries, lights, and wiring removed to better show a generator.
Figure 15:
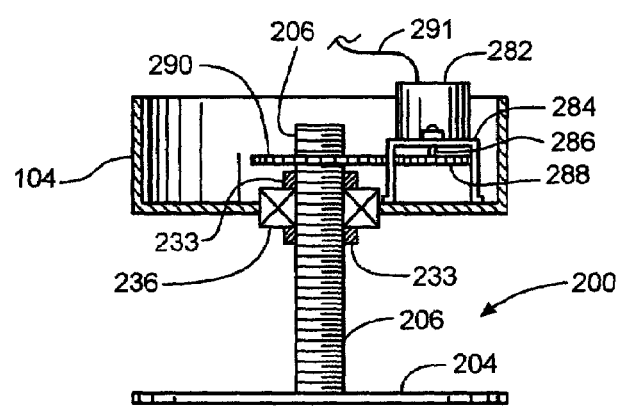

The power source is shown FIGS. 14-15. The power source includes a generator 282 which supplies electricity to lights 110 and serves to recharge batteries 216. In FIGS. 14-15, the electronics box, lights, and wiring harnesses (shown in FIG. 5) have been removed to better show the arrangement of generator 282 to unit base 104.

Generator 282 is mounted inside bottom 228 of unit base 104. The stator of generator 282 is coupled to bottom 228 by adjustable mounting brackets 284, which allow for various sizes of gears. Generator 282 has a rotor with a generator shaft 286 on which a generator gear 288 is mounted. Generator gear 288, in turn, is engaged to shaft gear 290, which is fixed to shaft 206. Shaft 206 rotates with respect to upper section 202 whenever the vehicle is moving.

When the vehicle is moving, the wheel assembly rotates. When the wheel assembly rotates, it rotates lower section 200, which is fixed to the wheel assembly. Shaft 206 of lower section 200 rotates as the vehicle moves. Upper section 202, however, does not rotate or rotates less than the rotation of the lower section 200 when the vehicle moves. Upper section 202 is eccentrically weighted by the off-center location of one or more of its internal components (the batteries, generator, and electronics box) or by the addition of special weights (not shown). Since upper section 202 is supported on a bearing and it is eccentrically weighted it does not rotate.

Since shaft 206 rotates and upper section 202 does not rotate or rotates less than the rotation of the lower section 200 when the vehicle moves, relative motion between shaft 206 and a generator is provided. Shaft gear 290 turns generator gear 288 and drives the generator. When the generator is driven, it provides electricity to the electronics box and the batteries 216 to which it is connected by power supply leads 291. The relative sizes of gears 288 and 290 can be varied to provide the desired electrical output.

There are several preferred methods for attaching wheel illumination device 100 to wheel assembly 114. These are illustrated in FIGS. 16-19 herein.

Figure 16:
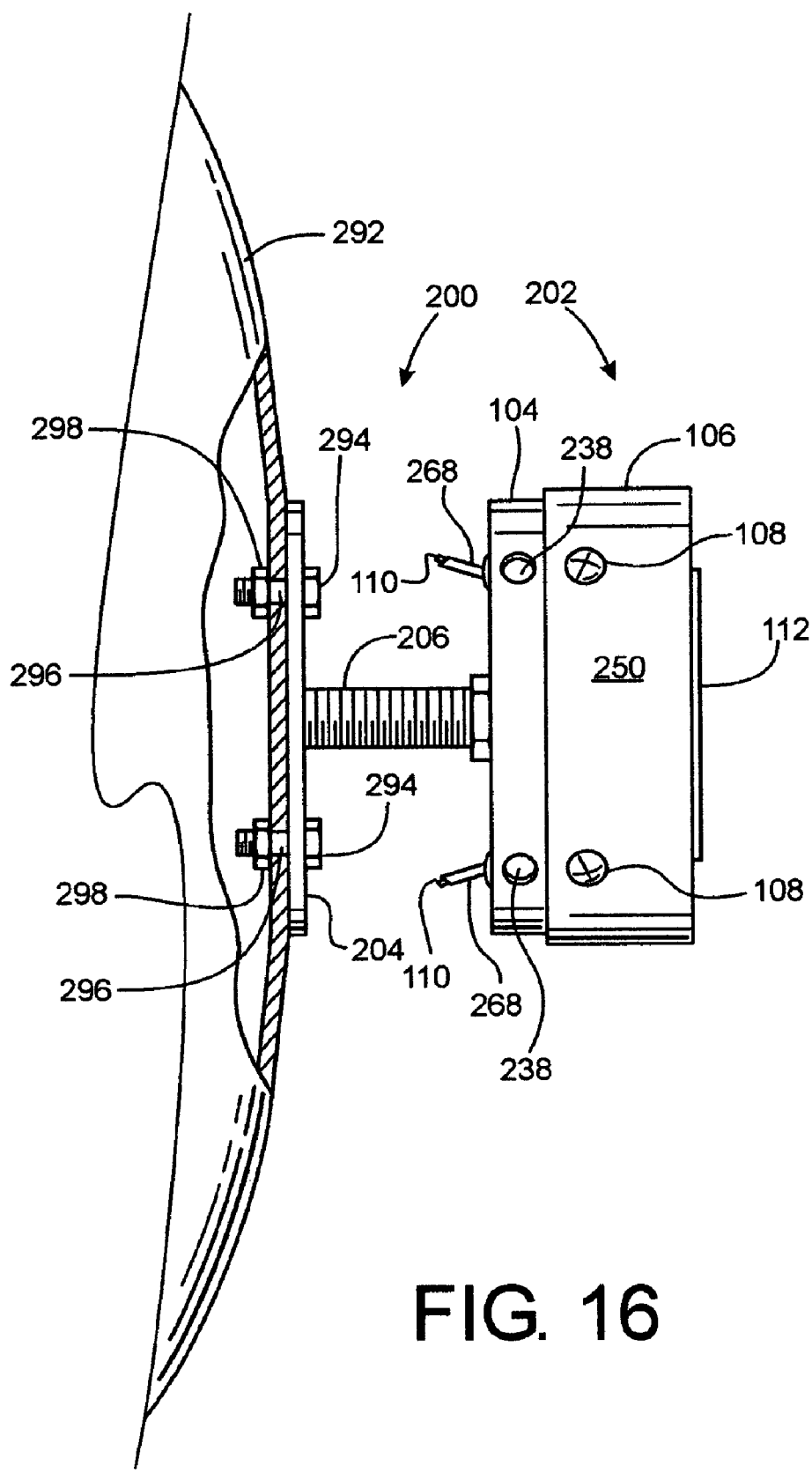
FIG. 16 is a partial cross sectional view of the wheel assembly and wheel illumination device of the foregoing figures, wherein the wheel illumination device is coupled directly to a hubcap.

In the first of these arrangements, shown in FIG. 16, lower section 200 is fixed to the center of a hubcap (or hub cover) 292. Hubcap 292 can be one provided by the automobile 98 manufacturer, or it may be a custom aftermarket hubcap. Hubcap 292 is fixed to wheel assembly 114 in the conventional manner. Fasteners 294 extend through holes 222 in base 204 to a lower better fit to surface being attached to if needed (such as concave or convex). The fasteners go through holes 222. Fasteners 294, in turn, pass through corresponding holes 296 in hubcap 292, and are fixed thereto by nuts 298 threaded onto the free end of fasteners 294. Before tightening nuts 298, the operator adjusts the position of lower section 200 until shaft 206 of lower section 200 is coaxial with the axis of rotation of wheel assembly 114. The operator then tightens nuts 298. Holes 296 in hubcap 292 may be made by the aftermarket installer of wheel illumination system 100 on hubcap 292. Slots 220 provide base 204 with some limited flexibility, permitting it to conform more easily with irregularly shaped hubcaps 292.

In a second arrangement, shown in FIG. 18, a universal attachment plate 300 (FIG. 17) is fixed to the free ends of lug nuts 302 of wheel assembly 114. Base 204 of lower section 200 is subsequently fixed to plate 300. Upper section 202 is subsequently fixed to lower section 200.

If the automobile 98 has one, the existing hubcap on the vehicle is removed and universal attachment plate 300 replaces it. Plate 300 has a plurality of holes 304 that are disposed about its periphery. These holes are selected and disposed to match several different lug nut patterns on a variety of automobiles.

Universal attachment plate 300 is formed as a series of two (shown here) or three concentric rings, each of said rings having a plurality of holes 304 arranged to match different lug nut patterns. For larger vehicles with wider spaced lug nuts, plate 300 can be fixed to lug nuts 302 by bolts 306 passing through holes 304 in the outer concentric ring 308. For smaller vehicles with closely spaced lug nuts, plate three can be fixed to lug nuts 302 by bolts 306 passing through holes 304 in the inner concentric ring 310. In the event inner concentric ring 310 is fixed to lug nuts, outer concentric ring 308 can be removed by sawing through tabs 312 that couple the inner and outer concentric rings. The figures herein show two concentric rings that are connected by tabs 312. In an alternative embodiment, an additional one or two concentric rings can be provided to match even larger lug nut patterns.

Lug nuts 302 can be standard lug nuts provided by the automobile 98 manufacturer, or they can be custom lug nuts that are provided as an aftermarket product. The distance plate 300 is spaced away from wheel assembly 114 can be varied by selecting lug nuts of greater or lesser length. Longer or "extension" lug nuts are preferred.

Base 204 is attached to plate 300 using threaded fasteners 294. Fasteners 294 extend through holes 222 in base 204.

Fasteners 294, in turn, pass through corresponding holes 304 in plate 300, and are fixed thereto by nuts 298 that are threaded onto the free end of fasteners 294. Before tightening nuts 298, the operator adjusts the position of lower section 200 until shaft 206 is coaxial with the axis of rotation of wheel assembly 114. The operator then tightens nuts 298.

Figure 19:
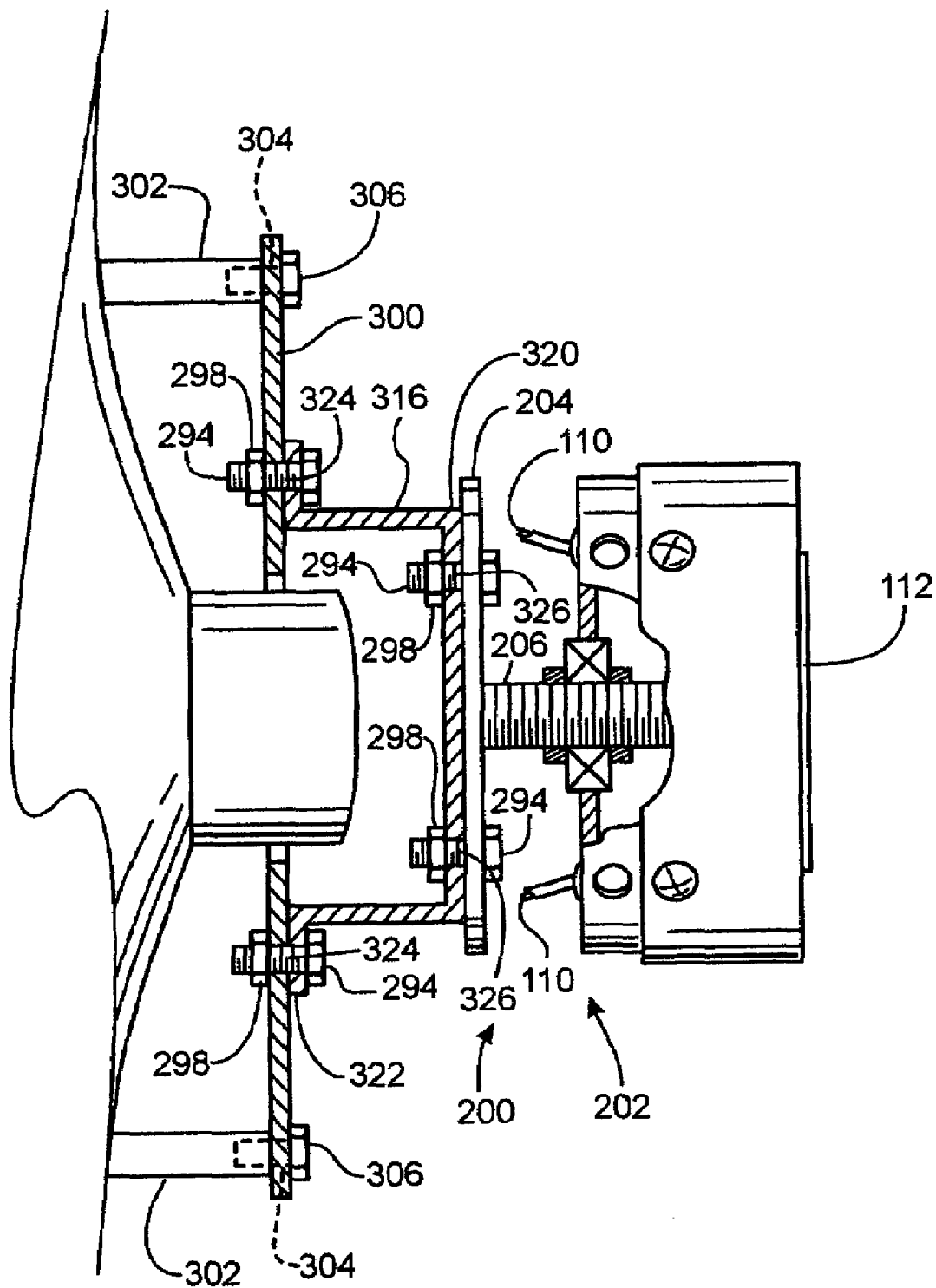
FIG. 19 is a partial cross sectional view of the wheel illumination device of the foregoing FIGURES, coupled to a hub cover, which is in turn coupled to the universal attachment plate of FIG. 17, which is in turn coupled to lug nuts of the wheel assembly.

In a third arrangement, shown in FIG. 19, base 204 is not fixed directly to plate 300, but is spaced away from plate 300 by hub cover 316. Hub cover 316 is provided for use in situations when the hub of wheel assembly 114 extends outward away from the wheel too far to permit base 204 to be attached to directly to plate 300.

Hub cover 316 is a hollow right circular cylindrical body 318 having a first enclosed end 320 and a circular flange 322 extending radially outward from a second end of body 318 about the entire circumference of body 318. Flange 322 is planar and is fixed to plate 300 with threaded fasteners 294. Fasteners 294 extend through holes 324 in flange 322, and then through corresponding holes 314 in plate 300. Nuts 298 are threaded onto the free end of fasteners 294 and are tightened. This arrangement fixes hub cover 316 to plate 300.

Base 204 is attached to hub cover 316 using threaded fasteners 294. Fasteners 294 extend through holes 222 in base 204. Fasteners 294, in turn, pass through corresponding holes 326 in first enclosed end 320 of hub cover 316, and are fixed thereto by nuts 298 that are threaded onto the free end of fasteners 294 inside hub cover 316.

Before tightening nuts 298 inside hub cover 316, the operator adjusts the position of lower section 200 until shaft 206 is coaxial with the axis of rotation of wheel assembly 114. The operator then tightens nuts 298.

Figure 20:
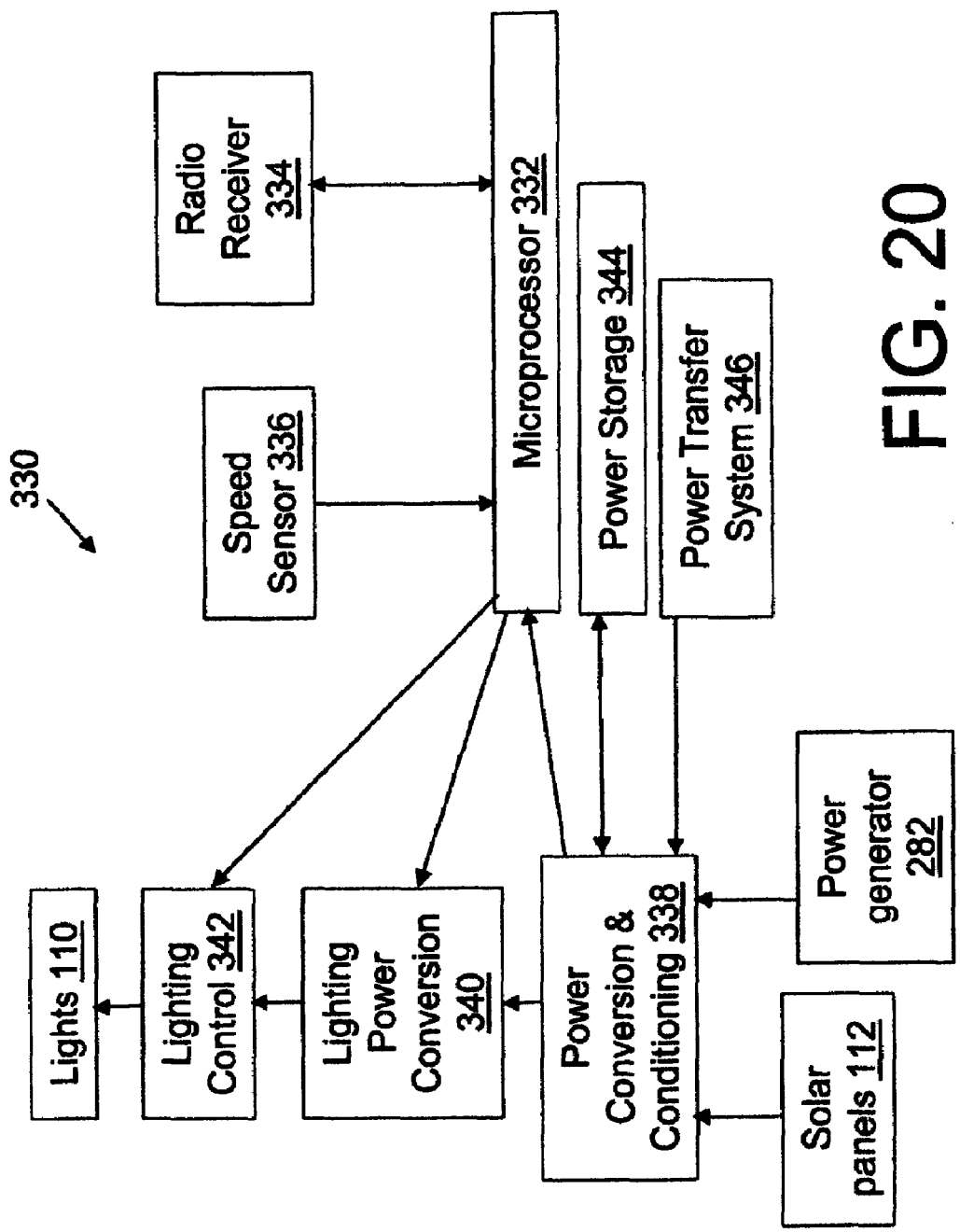
FIG. 20 is a schematic representation of the control circuit of the wheel illumination device, including the circuitry in the electronics box, the battery and the generator.

FIG. 20 is a schematic illustrating the control circuit 330 formed on the modular circuit board in the electronics box, together with the power source and battery. The core of the control circuit 330 is microprocessor 332, which controls the operation of the entire control circuit. Microprocessor 332 is coupled to a radio receiver 334 for receiving remote commands that control the device 100, a speed sensor 336, power conversion and conditioning circuitry 338, lighting power conversion circuitry 340, and lighting control circuitry 342. Lights 110 are coupled to lighting control circuitry 342 from which they receive their electrical signals and responsively generate light. Control circuit 330 also includes a power storage circuit 344 which includes rechargeable batteries 216. Power storage circuit 344 is coupled to power conversion and conditioning circuit 338. Solar panel 112 and generator 282 are also coupled to power conversion and conditioning circuit 338 to provide electrical power to the control circuit and the lights. Power transfer system 346 is also coupled to power conversion and conditioning circuit 338 to control the direction and flow of electrical power to and from the batteries 216, the generator 282, the solar panel 112, and the microprocessor 332.

Microprocessor 332 receives its power from power conversion and conditioning circuit 338. Power conversion and conditioning circuit 338 regulates the electricity supplied by solar panel 112 and power generator 282, as well as power storage circuit 344. As power is used by the power storage circuit 344, power conversion and conditioning circuit 338 directs electrical power from power generator 282 and solar panel 112 to power storage circuit 344.

Microprocessor 332 is configured to receive speed signals from speed sensor 336. Microprocessor 332 is also configured to receive commands from radio receiver 334, which in turn receives commands from the operator in the automobile 98 (see FIG. 21, below).

In response to these commands, microprocessor 332 is configured to control the direction and amount of electrical power provided to lights 110. Microprocessor 332 does this by signaling lighting control circuit 342. Lighting control circuit 342 regulates the flow of electricity from lighting power conversion circuit 340. Lighting power conversion circuit 340 regulates the voltage of the electrical power provided by power conversion and conditioning circuit 338 to a level that is compatible with lights 110.

Microprocessor 332 is programmed to selectively generate different patterns of light emitted by lights 110. It does this by calculating the duration and intensity of light that is required from lights 110 and signaling lighting control circuit 342 accordingly. Microprocessor 332 is preprogrammed to generate several patterns when requested by the user via radio receiver 334.

Microprocessor 332 is programmed to change the color of lights 110 by turning lights 110 of one color off and turning lights 110 of another color on. Microprocessor 332 is programmed to flash lights 110 by turning them on and off at a preprogrammed interval. Microprocessor 332 is further programmed to fairy the preprogrammed interval at which it turns the lights on and off. Microprocessor 332 is programmed to monitor speed sensor 336 and determine when the automobile 98 is stationary or moving at a predetermined speed. Microprocessor 332 is programmed to turn lights 110 off when the vehicle and the wheel assembly are stationary. Microprocessor 332 is also programmed in another mode of operation to turn lights 110 on when the vehicle and the wheel assembly start moving. Microprocessor 332 is also programmed to turn lights 110 on when the vehicle and the wheel assembly begin moving. Microprocessor 332 can change the speed of the patterns automatically by monitoring the speed of the vehicle and the wheel assembly using speed sensor 336. Microprocessor 332 is programmed to vary the light intensity with the volume of a sound signal provided by the user via radio receiver 334. In this manner, microprocessor 332 is configured to change the intensity of the plurality of lights 110 in synchrony with an audio source transmitted from the user to control circuit 330 via radio receiver 334.

Figure 21:
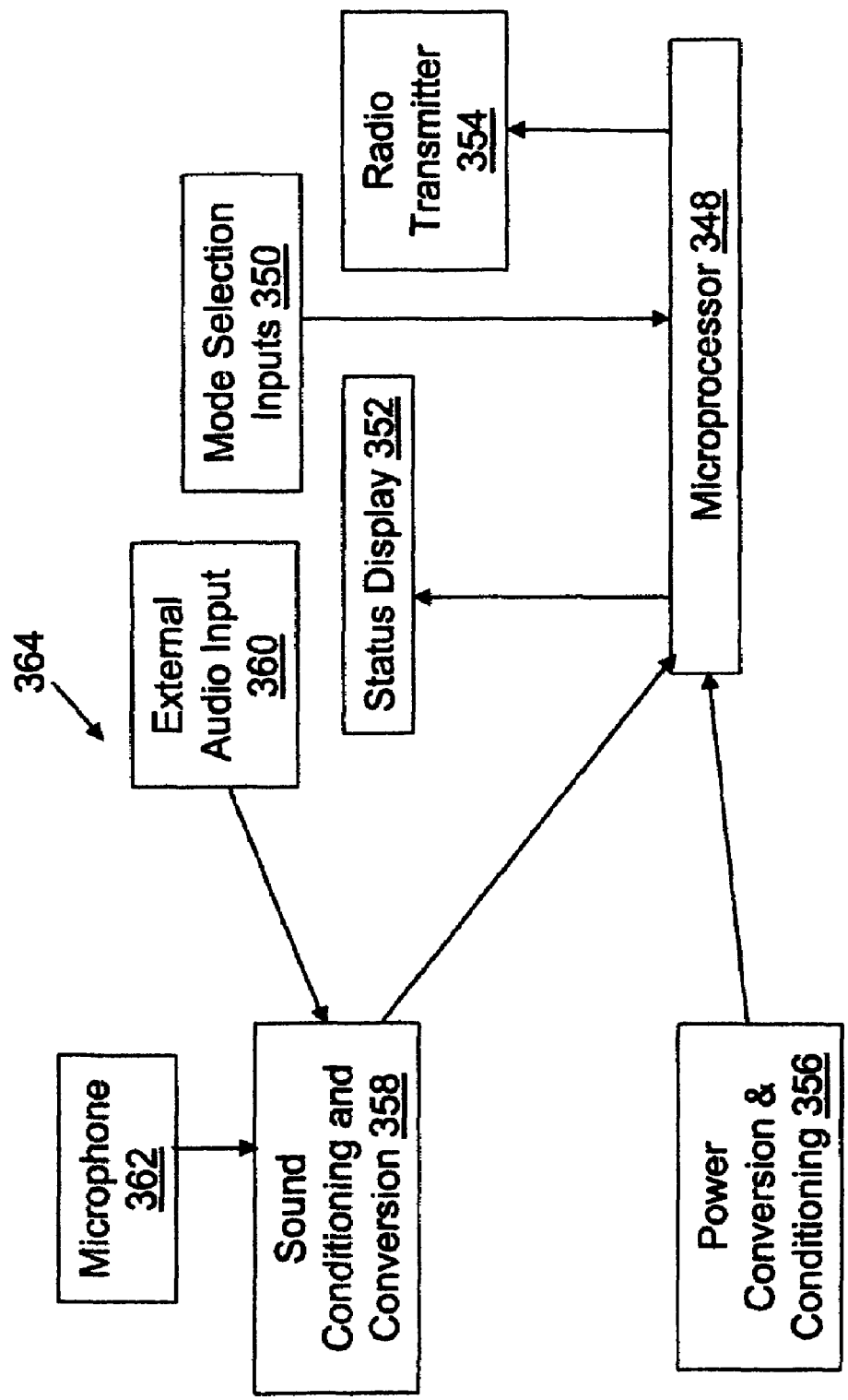
FIG. 21 is a schematic representation of an in-car remote control system configured to communicate with and program the control circuit of the wheel illumination device.

In FIG. 21 we see a remote control system 364 configured to transmit operator commands and audio signals to wheel illumination system 100 via a radio transmitter 354 (FIG. 20). Remote control system 364 includes a microprocessor 348 that receives operator mode selections from mode selection input device 350, and receives an audio signal from sound conditioning and conversion circuit 358. In response to these signals, microprocessor 348 transmits light command signals to radio transmitter 354. Radio transmitter 354, in turn, transmits these light command signals to radio receiver 334 (see FIG. 20) of the wheel illumination system 100. When radio receiver 334 receives these signals, it transmits them to microprocessor 332 of wheel illumination system 100, which responsively commands lighting control circuit 342 to generate the requested light patterns. In this manner, the user (who is preferably inside the operator's compartment of the automobile 98) can change the mode of operation of the wheel illumination system 100 and the patterns of light generated by lights 110 in real time as the automobile 98 travels down the road.

The user or operator communicates with microprocessor 348 by entering commands into mode selection input device 350. Mode selection input device 350 is preferably a touch screen display, incorporating a screen (status display 352) and a pressure sensitive transparent switching surface (mode selection input device 350). As the operator presses the touch screen, microprocessor 348 presents the user with a series of menus that are displayed on the touch screen. The operator can select whether to (1) turn the lights off, (2) turn the lights on, (3) turn the lights off automatically when the vehicle stops moving, (4) turn the lights on automatically when the vehicle stops moving, (5) turn the lights on automatically when the vehicle starts moving, (6) transmit sound intensity signals from a microphone 362 to the wheel illumination system 100, (7) transmit sound intensity signals from an external audio input 360 (from an audio source such as car stereo, car CD, satellite radio, terrestrial radio or the like) to the wheel illumination system 100, (8) select a desired color for lights 110, (9) select a desired rate at which to flash or blink lights 110.

The two microprocessors shown herein are preferably Microchip PIC microprocessors or Amtel. The patterns are stored in the NVRAM of the PIC microprocessors. The user selects the patterns from the touch screen/selection menu of the remote control system. The user selects specific colors by selecting predetermined modes of operation from the touch screen. Using the speed sensor, the wheel unit could time the pulses of light so as to create the illusion of the wheels rotating in either a counterclockwise or clockwise pace. The user selects specific colors by selecting predetermined modes of operation from the touch screen or selects custom color schemes using the same interface. To create a new pattern the user selects them using the remote control system, or downloads new patterns into the controller. The power may be provided by a power transit options system (e.g. a magnetic induction power systems such as used for security cards and rechargeable toothbrushes) or direct connect systems (rotor on back of wheel with contacts). The transmitter and receiver communicate over radio frequencies. Alternatively, other electromagnetic data link methods may be used as well these other methods within the electromagnetic spectrum include infrared and magnetic inductance data links.

One will appreciate that the present disclosure is intended as an exemplification of the invention, and is not intended to limit the invention to the specific embodiment illustrated. The disclosure is intended to cover by the appended claims all such modifications as fall within the scope of the claims.

I claim:

1. A system for illuminating a motor vehicle wheel assembly of a motor vehicle is provided, wherein the wheel assembly includes a wheel and a tire, the system comprising:
   a mount configured to be fixed to the wheel assembly;
   a plurality of lights fixed to the mount and directed toward the wheel for reflection therefrom, wherein the mount further comprises a housing having a plurality of adjustable light mounts, and further wherein the plurality of lights are coupled to the housing via the plurality of adjustable light mounts;
   a control module coupled to the plurality of lights to regulate a flow of electricity to the plurality of lights;
   a power source coupled to the control circuit to provide said control circuit with electrical power for the lights, wherein the power source includes an electrical energy generating element and an electrical energy storing element;
   a lower section fixed to the wheel assembly to rotate with the wheel assembly;
   an upper section enclosing the control module and the power source; and
   a bearing disposed between the lower section and the upper section to permit relative rotation between the lower section and the upper section.

2. The system of claim 1, wherein the control module is configured to automatically turn on the plurality of lights.

3. The system of claim 1, wherein the control module is configured to store light patterns.

4. The system of claim 1, wherein the control module is configured to change light patterns automatically.

5. The system of claim 1, wherein the control module is responsive to remote control signals indicative of a pattern of light illumination.

6. The system of claim 1, wherein the control module is configured to change the colors of the plurality of lights.

7. The system of claim 1, wherein the control module is configured to turn the plurality of lights on and off.

8. The system of claim 1, wherein the control module is configured to change a rate at which the plurality of lights is turned on and off.

9. The system of claim 1, wherein the control module is configured to change an intensity of the plurality of lights.

10. The system of claim 1, wherein the control module is configured to energize the plurality of lights when the wheel assembly is stationary.

11. The system of claim 1, wherein the control module is configured to change an intensity of the plurality of lights in synchrony with an audio source.

12. The system of claim 1, wherein the electrical energy generating element is a generator.

13. The system of claim 12, wherein the generator is coupled to the motor vehicle wheel assembly to rotate and generate electricity when the motor vehicle is driven.

14. The system of claim 12, wherein the generator is coupled to the motor vehicle wheel assembly to not rotate and not generate electricity when the motor vehicle is stopped.

15. The system of claim 1, wherein the electrical energy storing element includes a rechargeable battery.

16. The system of claim 1, wherein each light of the plurality of lights has a color different from another light of the plurality of lights.

17. The system of claim 1, wherein at least one of the plurality of light mounts is a swivel mount.

18. The system of claim 1, wherein at least one of the plurality of light mounts is a flexible gooseneck mount.

19. The system of claim 1, wherein at least one of the plurality of light mounts is a tube.

20. The system of claim 1, wherein at least one of the plurality of light mounts is an extension tube.

21. The system of claim 1, wherein the housing encloses the power source.

22. The system of claim 1, wherein the upper section further comprises:
   a unit base; and
   a cover; wherein the unit base and the cover are coupled together to define an internal cavity configured to receive and support the control module and the power source.

23. The system of claim 22, wherein the plurality of lights are coupled to holes formed in the unit base.

24. The system of claim 1, wherein the electrical energy generating element further comprises a generator, and further wherein said generator is coupled to said lower section to be driven thereby.

25. The system of claim 24, wherein the generator is coupled to and charges the electrical energy storing element.

26. The system of claim 1, wherein the electrical energy generating element comprises a solar cell.

27. A system for illuminating a wheel comprising:
   a first section attachable to the wheel;
   a second section spaced from the first section, wherein the first section rotates with respect to the second section; the second section comprising a plurality of lights directed toward an outer surface of the wheel for reflection toward an observer; and a power source attachable to the wheel, wherein the power source includes a generator and a battery, the generator supplies charge to the battery and the battery powers the plurality of lights.

28. The system of claim 27, wherein the plurality of lights is configured to emit light both when the wheel is not rotating and when the wheel is rotating.

29. The system of claim 27, the first section further comprising a mounting plate having a plurality of holes that are configured to engage lug nuts securing the wheel to the motor vehicle.

30. The system of claim 29, the second section further comprising an enclosure, wherein the plurality of lights, a control module, and the power source are supported within the enclosure.

31. The system of claim 27, wherein the wheel further comprises a hubcap, the first section further comprising a mounting plate configured to be fixed to the hubcap.

32. The system of claim 27, wherein the second section does not rotate.

33. The system of claim 27, wherein the second section further comprises a control module for controlling the functions of the plurality of lights.

34. The system of claim 33, wherein the control module comprises a transmitter and a receiver and provides remote control of the operation of the plurality of lights.

35. The system of claim 33, wherein the control module is configured to change an intensity of the plurality of lights in response to an audio signal.

36. The system of claim 34, wherein the control comprises emitting light in a plurality of light patterns and changing the light patterns.

37. The system of claim 34, wherein the control module and plurality of lights are configured to emit at least one pattern of light, and further wherein said control module is configured to change said at least one pattern of light in response to remote control signals.

38. The system of claim 34, wherein the control module is configured to change a rate at which the plurality of lights turn on and off in response to remote control signals.

39. A system for illuminating a wheel comprising:

a first section attachable to the wheel;

a second section coupled to the first section, the second section comprising a plurality of lights directed toward the wheel for reflection therefrom, wherein the plurality of lights are coupled to the second section via a plurality of adjustable light mounts; and a power source configured to be supported on the wheel to provide electrical power to the plurality of lights;

wherein the first section is adapted to rotate relative to the second section.

40. The system of claim 39, wherein the second section is adapted to remain stationary.

41. The system of claim 39, wherein the first section comprises a base, a shaft and a shaft gear fixed to the shaft;

the power source comprising a generator having a generator gear that engages the shaft gear.

42. The system of claim 41, the power source further comprising an energy storing element adapted to be charged by the generator.

43. The system of claim 42, wherein the plurality of lights is powered by the electrical storing element.

\* \* \* \* \*